Patented Jan. 7, 1930

1,743,083

UNITED STATES PATENT OFFICE

TREAT B. JOHNSON, OF BETHANY, CONNECTICUT, ASSIGNOR TO WINTHROP CHEMICAL COMPANY, OF NEW YORK, N. Y., A CORPORATION OF NEW YORK

CATECHOL THIAZOLES AND PROCESS OF MAKING THE SAME

No Drawing. Application filed February 3, 1928. Serial No. 251,742.

The present invention relates to catechol thiazole compounds, and resides in thiazole compounds containing the catechol nucleus in position —4 of the thiazole ring, and to processes of preparing the same.

I have discovered that new thiazole compounds corresponding to the general formula

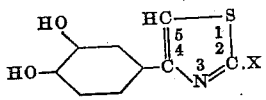

wherein X represents one of the groups, amino, alkylamino, dialkylamino, aminoalkyl, alkyl-aminoalkyl, dialkyl-aminoalkyl, acetylaminoalkyl, acetylalkylamino, mercapto, aryl, alkylaminohydroxyalkyl and alkoxyl, may be synthesized and that the said new compounds bear a close therapeutic similarity to the known compounds of the type formula

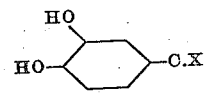

where X has the values above expressed.

One procedure which is susceptible to general application in the synthesis of the new compounds of the genus above defined consists in condensing a halogenacetopyrocatechol,—preferably, chloroacetopyrocatechol

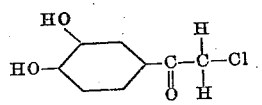

—, with an organic compound containing either sulfur or selenium and a trivalent nitrogen atom both attached to a single carbon atom, said organic compound having a constitution which may be represented by the general formula

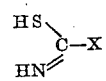

wherein Y represents one of the elements of the group sulfur and selenium, and X represents one of the groups amino-, alkylamino-, dialkylamino-, aminoalkyl-, alkylaminoalkyl-, dialkylaminoalkyl-, acetylaminoalkyl-, acetylalkylamino-, mercapto-, aryl-, alkylamino hydroxyalkyl-, and alkoxyl. While the equivalency of selenium and sulfur in the aforesaid reactant is claimed, the following decription will refer more particularly to the use of compounds of the general formula

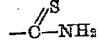

wherein X has the values above expressed.

Among operable compounds containing the said $$-\overset{S}{\underset{}{C}}-NH_2$$

grouping are, for example: thioamides, thioureas, thio carbamates and dithiocarbamates. The reaction, which may be expressed graphically by the equation

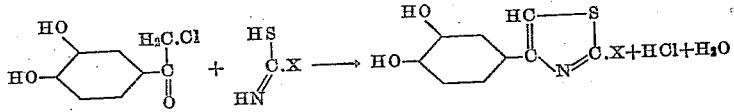

generally may be effected by bringing together chloroacetopyrocatechol and one of the above described reactants in solution in a mutual solvent, such as, for example, an alcohol such as ethyl alcohol, an ether, an acetone-like solvents or the like, but preferably, ethyl alcohol, and suitably heating the solution mixture. The resulting thiazole compounds usually are separated from the solvent, by cooling, in the form of their hydrochlorides, or of their free bases, having definite crystalline structure. The reaction effects a bridging,—by means of a thiazole ring,—or the aromatic nucleus and side chains of compounds of the type of adrenaline:

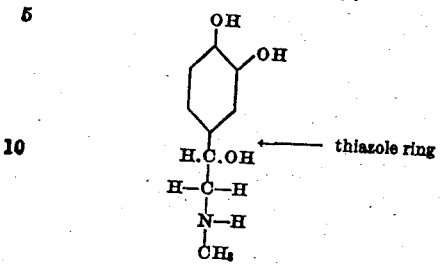

and ephedrine:

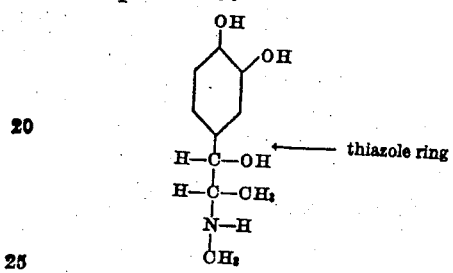

A feature of especial interest from the standpoint of therapy is that the said thiazole-containing compounds possess substantially the same physiological efficacy as do the corresponding catechol-containing compounds not containing the thiazole ring bridge, differing from the latter only in that the "bridged" compounds exhibit a markedly diminished toxicity.

The following examples serve to describe the invention more fully.

*Example I.*—Preparation of 2-amino-4-(3,4) dihydroxyphenyl-thiazole hydrochloride.

5 parts by weight of thiourea and 12 parts by weight of chloroacetopyrocatechol are dissolved in from 5 to 7 parts by weight of ethyl alcohol and the solution heated on a water bath at a temperature of 70–100° C. for a period of from one-half to one hour. Upon cooling the solution after completion of the reaction, 2-amino-4(3,4) dihydroxy-phenyl-thiazole, having most probably the formula:

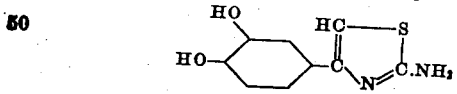

—, in the form of its hydrochloride,—separates out in the form of colorless crystals. Dilution of the alcohol with acetone expedites the separation step. The yield is approximately 2.5 to 2.8 times the weight of the thiourea employed. From the compound soluble salts may be formed. The hydrochloride is easily purified by re-crystallization from ethyl alcohol. It is soluble in water and ethyl alcohol, and insoluble in ether, benzene, acetone, and ethyl acetate. It decomposes at 230–235°. (Analysis: Calculated for $C_9H_9N_2SCl.H_2O$: C=41.1; H=4.2; N=10.7. Found: C, 41.6; H, 4.3; N, 10.6.)

*Example II.*—Preparation of 2-methylamino-4(3,4) dihydroxyphenylthiazole hydrochloride.

5 parts by weight of methylthiourea and 10 parts by weight of chloroacetopyrocatechol are dissolved in from 5 to 7 parts by weight of ethyl alcohol, and the solution is warmed only gently (i. e., up to about 50–60° C.). An immediate reaction obtains, and, after cooling, the hydrochloride of 2-methylamino-4(3,4) dihydroxyphenyl thiazole of the probable formula

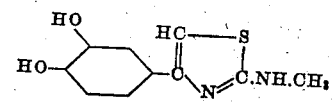

separates out in quantitative yield. After filtering and washing with acetone, the salt may easily be further purified by recrystallization from dilute hydrochloric acid. It is moderately soluble in water and in alcohol, and substantially insoluble in ether, benzene, acetone and ethyl acetate. It decomposes at 275°–280° C. (Analysis: Calculated for $C_{10}H_{11}O_2N_2SCl$. C=46.4; H=4.3; N=10.8. Found: C, 46.7; H, 4.3; N, 10.5.)

*Example III.*—Preparation of 2-acetylmethylaminomethyl-4(3,4) dihydroxyphenyl thiazole hydrochloride.

6 parts by weight of acetylmethylamino-acetothioamide

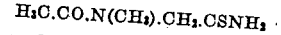

and 7.8 parts by weight of chloroacetopyrocatechol are dissolved in from 5 to 7 parts by weight of ethyl alcohol, and the solution is warmed on the water bath at a temperature of 50–65° C. The reaction is initiated immediately. After warming for about one hour and then allowing to stand for 10–12 hours at room temperature, a yield of the hydrochloride of 2-acetylmethylaminomethyl-4-(3,4) dihydroxyphenyl thiazole of the probable formula

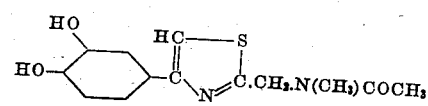

is obtained corresponding to 80–90 percent of that theoretically obtainable. The salt is purified by dissolving in alcohol and precipitating with ether. It has a melting point of 186–188° C. (Analysis: Calculated for $C_{13}H_{15}O_3N_2SCl$: N=8.9. Found: N, 8.85 and 9.0.)

*Example IV.*—Preparation of 2-methylaminomethyl-4(3,4)-dihydroxyphenyl thiazole This compound, having most probably the formula

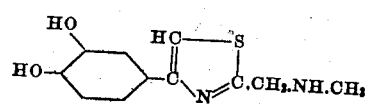

—, is readily formed by hydrolysis of its corresponding acetyl derivatives (i. e., the product of Example III). The hydrolysis is accomplished by digesting the acetyl derivative with strong hydrochloric acid in a boiling water bath; the change is complete after about 2 hours digestion. The yield of hydrochloride salt corresponds to about 80–85 percent of the theoretical. The salt is purified by dissolving in absolute alcohol and precipitating with ether. It decomposes at 220–225° C. It is soluble in water and in alcohol. The free base melts at 128–130° C. (Analysis: Calculated for $C_{11}H_{12}O_2N_2S.C_2H_5OH$: N=9.93. Found: N, 9.92–10.0.)

*Example V.*—Preparation of 2-phenyl-4(3,4)-dihydroxyphenyl thiazole.

4 parts by weight of thiobenzamide and 5 parts by weight of chloroacetopyrocatechol are dissolved in 10 to 12 parts of ethyl alcohol, and the solution is refluxed on a boiling water bath; the reaction is complete after 12 hours. Upon cooling the solution the free thiazole having the probable formula

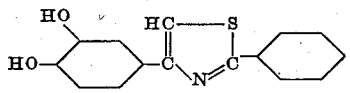

separates in the form of colorless, shining plates of leaflets. The compound is easily purified by recrystallization from dilute alcohol and melts at 164–165° C. (Analysis: Calculated for $C_{15}H_{11}O_2NS.H_2O$: N=4.86. Found: N, 4.7; —4.6)

*Example VI.*—2 - acetylaminomethyl - 4-(3.4)-dihydroxyphenyl thiazole

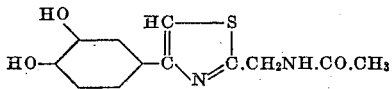

is synthesized by condensing chloroacetopyrocatechol with acetylaminoacetothioamide. This acetyl compound separates from alcohol in the form of prisms melting at 188–190° C. The yield is equal to the amount by weight of the thioamide used as reactant.

*Example VII.*—2 - acetylaminoisopropyl-4(3,4)-dihydroxyphenyl thiazole.

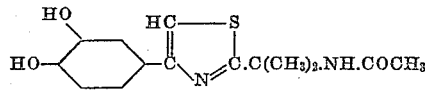

has the melting point 198–200° C.

*Example VIII.*—2-aminoisopropyl-4(3,4)-dihydroxyphenyl thiazole

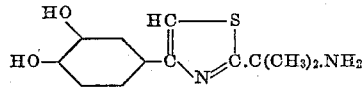

in the form of its hydrochloride, is soluble in water and in alcohol. It decomposes at 210–215° C.

*Example IX.*—2-aminomethyl-4(3,4)-dihydroxyphenyl thiazole

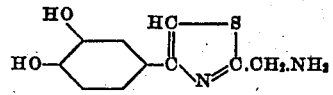

is produced, in the form of its hydrochloride, when the corresponding acetyl compound (i. e., the product described in Example VI above) is warmed on the boiling water bath with concentrated hydrochloric acid. The yield is nearly theoretical. This free amino compound, is, in the form of its hydrochloride, soluble in water and in alcohol, and insoluble in ether. It decomposes at 225–230° C.

*Example X.*—2 - mercapto - 4(3,4) - dihydroxyphenyl thiazole

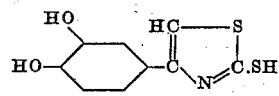

This compound, obtainable by condensation of chloroaceto-pyrocatechol and ammonium dithiocarbamate

—, is insoluble in water and soluble in alcohol. It melts at 250° C. with decomposition. The sulfur is firmly bound, not being removed by treatment with alkali.

*Example XI.*—2-(α-hydroxy-β-methylamino)-ethyl - 4(3,4) - dihydroxyphenylthiazole (thiazole adrenaline)

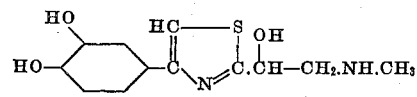

This compound may be obtained by condensing chloroacetopyrocatechol and α-hydroxy-β-methylamino-thiopropionamide.

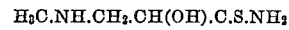

the said thiazole compound also may be prepared by an indirect procedure involving the substitution of a methylamino group for chlorine in the compound 2-chloroacetyl-4-(3,4)-dihydroxyphenyl thiazole

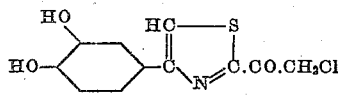

and reducing the resulting compound; thus:

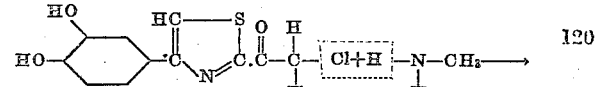

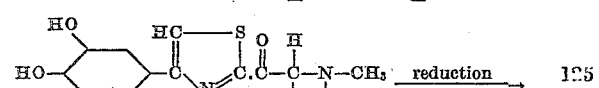

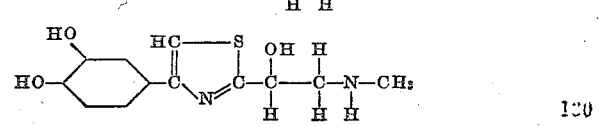

*Example XII.*—2-(α-hydroxy-β-methylamino)-propyl-4(3,4)-dihydroxyphenyl thiazole (thiazole ephedrine):

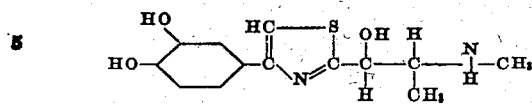

The compound may be prepared by condensing chloroacetopyrocatechol and α-hydroxy-β-methylamino-thiobutryamide

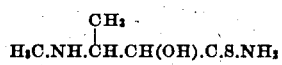

or, by an indirect procedure, according to the following equation:

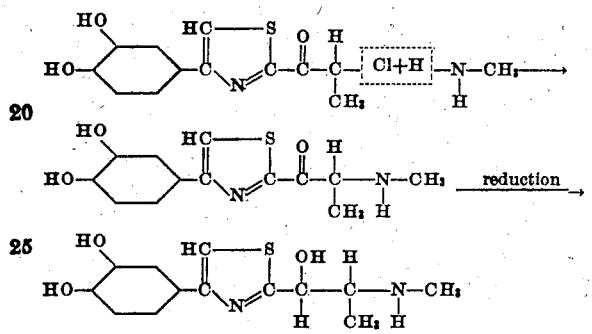

As will be apparent, the catechol thiazoles containing more complex side chains in the 2-position of the thiazole ring may be synthesized from the thiazole combinations containing simple 2-position side chains. Thus, the following procedure will illustrate the possibility of incorporating an amino acid group into a catechol thiazole by starting with a simple representative:

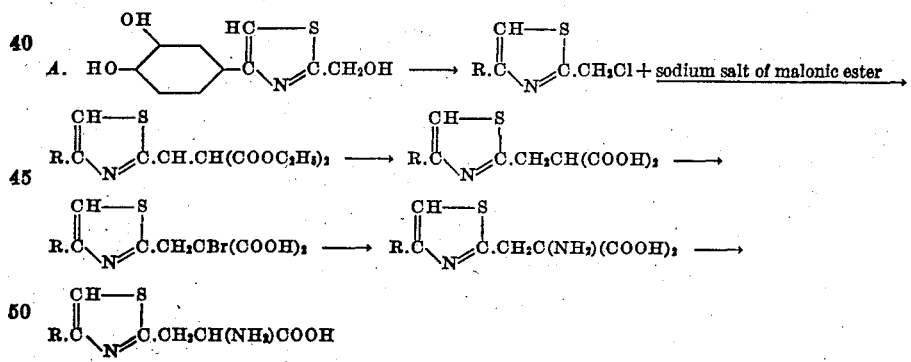

*B.* Another illustration involves the oxidation of the alcohol to the corresponding aldehyde II and acid III

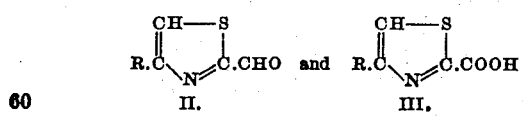

Applying fundamental type reactions to one or the other of these two simple combinations one obtains new thiazole combinations containing more complex side chains.

It is to be understood that, for the purposes of the present invention, the type groupings:

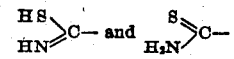

are considered to be isomeric representations of identical compounds. Likewise, as has been indicated hereinbefore, selenium is to be understood as being the equivalent of sulfur in the above type groupings.

I claim:

1. Process which comprises condensing with a halogen-acetopyrocatechol an organic compound containing the grouping

2. Process which comprises condensing with chloroacetopyrocatechol an organic compound containing the grouping

3. Process which comprises condensing with chloroacetopyrocatechol a compound of the general formula

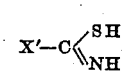

wherein X′ represents a residue containing a trivalent nitrogen atom.

4. Process which comprises condensing with chloroacetopyrocatechol a compound of the general formula

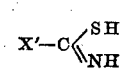

wherein X′ represents an aliphatic chain containing a trivalent nitrogen atom.

5. Process which comprises condensing with chloroacetopyrocatechol a compound of the general formula

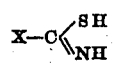

wherein X represents one of the groups aminoalkylamino, dialkylamino, aminoalkyl, alkylaminoalkyl, dialkylaminoalkyl, acetylalkylamino, acetylaminoalkyl, mercapto, aryl, alkylaminohydroxyalkyl and alkoxyl.

6. As new products, compounds of the general formula

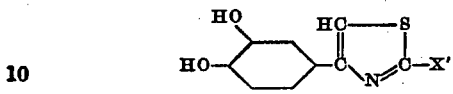

wherein X' represents a residue containing a trivalent nitrogen atom.

7. As new products, compounds of the general formula

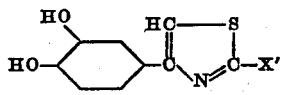

wherein X' represents an aliphatic side chain containing a trivalent nitrogen atom.

8. As new products, compounds of the general formula

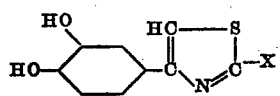

wherein X represents one of the groups, amino, alkylamino, dialkylamino, aminoalkyl, alkylaminoalkyl, dialkylaminoalkyl, acetylalkylamino, acetylaminoalkyl, mercapto, aryl, alkylaminohydroxyalkyl and alkoxyl, being in the solid state, generally crystalline products of basic nature and soluble in ethyl alcohol and insoluble in ether, benzene, acetone and ethylacetate.

In testimony whereof, I affix my signature.

TREAT B. JOHNSON.